United States Patent

Kitahara et al.

[11] Patent Number: 5,081,616
[45] Date of Patent: Jan. 14, 1992

[54] POSITIONING CONTROLLER

[75] Inventors: Nobuhiko Kitahara; Daizoh Morita, both of Tokyo, Japan

[73] Assignee: TEAC Corporation, Japan

[21] Appl. No.: 614,612

[22] Filed: Nov. 16, 1990

[30] Foreign Application Priority Data

Nov. 21, 1989 [JP] Japan .............................. 1-135241[U]

[51] Int. Cl.$^5$ .............................................. G11B 21/08
[52] U.S. Cl. .......................................... 369/47; 369/43
[58] Field of Search ...................... 369/47, 43, 32, 111

[56] References Cited

U.S. PATENT DOCUMENTS

| 4,847,708 | 7/1989 | Furuyama | 369/32 |
| 4,939,712 | 7/1990 | Abe et al. | 369/32 |

FOREIGN PATENT DOCUMENTS 9677 2/1989 Japan .

Primary Examiner—Roy N. Envall, Jr.
Assistant Examiner—Muhammad N. Edun
Attorney, Agent, or Firm—Andrus, Sceales, Starke & Sawall

[57] ABSTRACT

A positioning controller can position a head at a starting position of an unrecorded region on a disk in a shorter time than a conventional positioning controller, information being recorded on the disk by means of the sequentially inner-to-outer recording method or the sequentially outer-to-inner recording method. The positioning controller judges whether or not information is recorded at a predetermined position on the disk, and then executes the binary search method in a recording direction from the predetermined position of the disk when judged the information is recorded at the predetermined position or in a direction opposite to the recording direction from the predetermined position when it is judged that the information is not at the predetermined position. Therefore the direction in which searching by the binary search method is executed is determined by the above judgement. The term "the sequentially inner-to-outer recording method" means a method for recording information sequentially from the most inner track to the most outer track on the disk. And the term "the sequentially outer-to-inner recording method" means a method for recording information sequentially from the most outer track to the most inner track on the disk. The present invention is particularly applicable to write-once optical disk storages.

13 Claims, 4 Drawing Sheets

POSITIONING CONTROLLER

BACKGROUND OF THE INVENTION

The present invention relates generally to positioning controllers, and more particularly to a positioning controller for positioning a head at a starting position of an unrecorded region on a disk on which information is recorded by means of the sequentially inner-to-outer recording method or the sequentially outer-to-inner recording method.

The present invention is particularly applicable to write-once optical disk storages. The term "the sequentially inner-to-outer recording method", as used herein, means a method for recording information sequentially from the most inner track to the most outer track on the disk. And the term "the sequentially outer-to-inner recording method", as used herein, means a method for recording information sequentially from the most outer track to the most inner track on the disk. For example, a case where information is recorded on a file sequential-addressed by means of the ascending order or the descending order may be regarded as the sequentially inner-to-outer recording method or the sequentially outer-to-inner recording method. The term "write-once", as used herein, means a type of an optical disk unable to overwrite information at a predetermined region where other information has been recorded in advance. From this point of view, it differs from an erasable type of an optical disk which is able to overwrite the information at a predetermined region even if other information has been recorded thereon in advance.

In write-once optical disk storages, information is usually recorded by means of the sequentially inner-to-outer recording method. Before a plurality of information is recorded on the disk, for example, before second information is recorded, a last position of a recorded region of first information which is recorded just before the second information (the last position will be called "the last recorded position" hereafter) must be searched first of all. After searching the last position, then a head is moved to a position having an address next to an address of the last recorded position in order to record the second information. Hereupon, the address corresponding to the last recorded position will be defined as the last recorded address (called "LRA" for short), the address next to LRA will be defined as the recording start address (called "RSA" for short), and the position having RSA will be defined as the recording start position hereafter. Therefore, when arbitrary information is recorded on the disk, the last recorded position of information just prior to the arbitrary information must be searched in advance.

Among the methods of searching the last recorded position, the following method has been suggested. That is, an optical head is moved initially from the most inner track to the most outer track sequentially on a disk on which information is recorded by means of sequentially inner-to-outer recording method while reading a presence of recorded information thereof.

When the last recorded position is searched, LRA is stored in RAM (random access memory) as address information. Incidentally, RSA may be recorded in RAM instead of storing LRA. Thus when an attempt is made to record the next information, the head is positioned at a recording start position on the basis of the address information stored in RAM. Needless to say, the disk has been formatted so as to have address tracks on the whole recording surface thereof in advance.

However the above conventional method has the following disadvantages. It takes much time to search the last recorded position because the head must move and read the whole recorded region of the disk. Therefore, the broader the recorded region becomes, the more time it takes to search the last recorded position, and thus, much time is spent for the initial operation, so that information will not be recorded immediately.

SUMMARY OF THE INVENTION

Accordingly, it is a general object of the present invention to provide a novel and useful positioning controller in which the disadvantages described above are eliminated.

Another object of the present invention is to provide a positioning controller for positioning a head at a recording start position on a disk in a shorter time than done by the conventional art.

Another more specific object of the present invention is to provide a positioning controller which is used for a disk storage device including a disk of which addresses are prerecorded on a recordable region by means of the sequential addressing, a head for recording information on the disk and reproducing information therefrom, and moving means for moving the head to a position corresponding to a predetermined address on the basis of address information indicating the predetermined address, the information being recorded sequentially on the disk, which positioning controller comprises first control means for controlling a driving of the disk and/or a recording and/or reproducing operation of the head, second control means, connected to the moving means, for supplying the address information to the moving means, first judging means, connected to the first control means and second control means, for judging whether or not the information is recorded on an arbitrary position on the disk, position searching means, connected to the first judging means, after the information is reproduced by the head at a predetermined position by the first control means and the second control means, for executing a first binary search for addresses from the predetermined position in a forward direction in which the information is recorded if the first judging means judges the information is recorded at the predetermined position, for executing a second binary search for addresses from the predetermined position in a backward direction opposite to the forward direction if the first judging means judges the information is not recorded at the predetermined position, for continuing one of the first binary search and the second binary search in the forward direction if the first judging means judges the information is recorded at a searched position which has been searched by one of the first binary search and the second binary search, and for continuing one of the first binary search and the second binary search in the backward direction if the first judging means judges the information is not recorded at a searched position which has been searched by one of the first binary search and the second binary search, in order to search a target address before second information is recorded on the disk, which target address approximately corresponds to the last recorded position of first information recorded just before the second information, and memory means, connected to the position searching means, for memorizing the target address searched by the position searching means as the address information, the target address being one of a last recorded address corresponding to the last recorded position of the first information and a recording start position next to the last recorded address in the forward direction, the second control means being connected to the memory means to supplying the address information memorized by the memory means to the moving means so that the head is positioned at the recording start position corresponding to the recording start address.

According to the present invention, the head is positioned in a shorter time at a recording start position by judging whether or not information is recorded at a predetermined position on a disk and then using the judging result and the binary search method.

Other objects and further features of the present invention will be apparent from the following detailed description when read in conjunction with the accompanying drawings.

DESCRIPTION OF PREFERRED EMBODIMENTS

Figure 1:
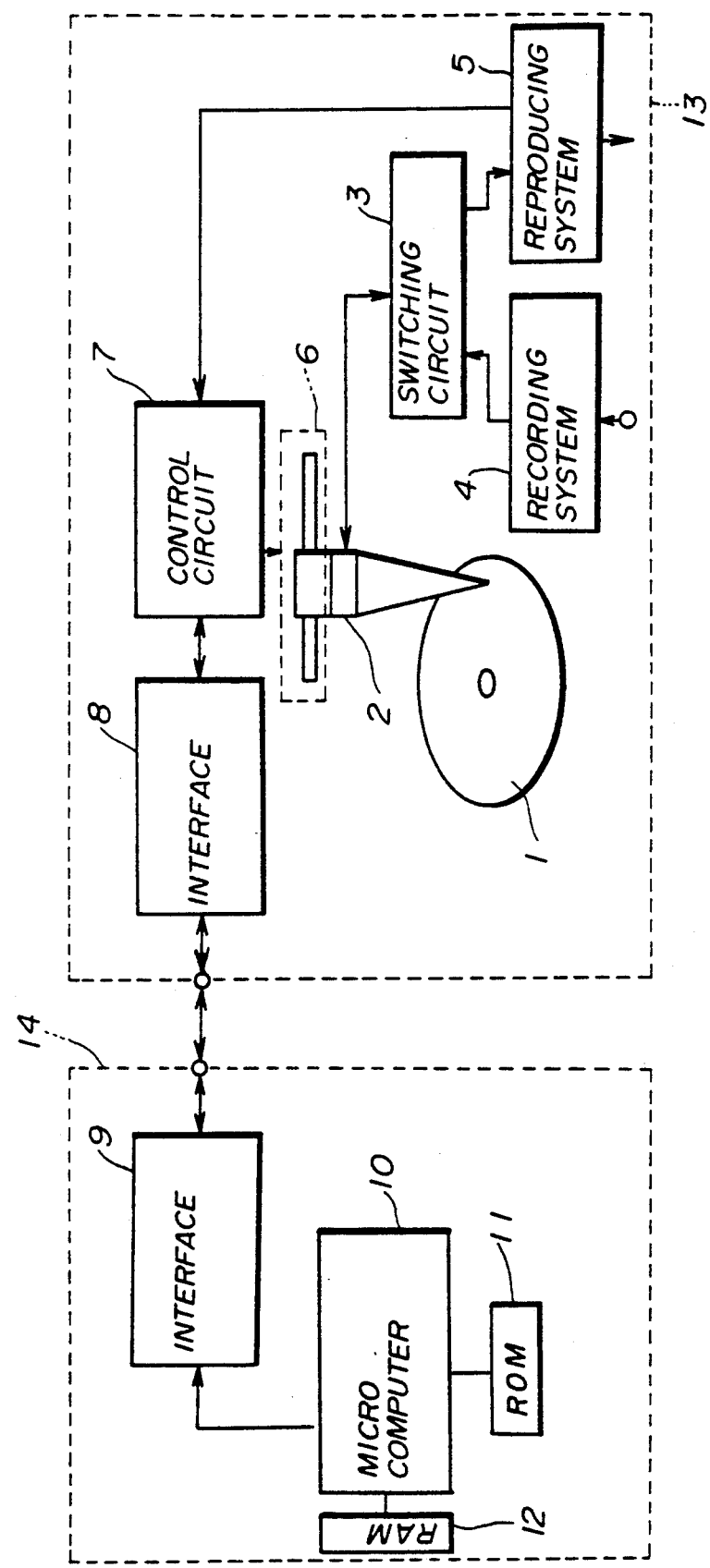
FIG. 1 is a block diagram for explaining a positioning controller of a first embodiment according to the present invention.

FIG. 1 shows a positioning controller according to the present invention applied to a write-once optical disk storage. The write-once optical disk storage 13 comprises a write-once optical disk 1 on which information is recorded by means of the sequentially inner-to-outer recording method, an optical head 2, a switching circuit 3, recording system 4, reproducing system 5, an actuator 6, and an interface 8. The disk 1 is formated so as to have address tracks which were sequentially addressed so that the address increases sequentially from the most inner track to the most outer track. However the present invention can be applied to any disk as long as the disk is sequentially addressed. Therefore the disk is formatted so as to have address tracks which are sequentially addressed so that the address increases sequentially from the most outer track to the most inner track. In addition, each track does not always have one address. The head 2 can record image signals on a disk 1 and reproduce them therefrom by analog representation. The head 2 is connected to the recording system 4 and reproducing system 5 via the switching circuit 3, and it receives image signals from the recording system 4 and transmits them to the reproducing system 5. The switching circuit 3 is a switch for connecting the head 2 to one of the recording system 4 and reproducing system 5. The head 2 is supported by the actuator 6. The actuator 6 may be a linear type actuator or a rotary type actuator, and it moves the head 2 in a direction approximately radial to the disk 1. The moving of the actuator 6 is controlled by a control circuit 7. The control circuit 7 is further controlled by an external controller 14 to which the control circuit 7 is connected via the interface 8. The positioning controller according to the present invention is an apparatus for positioning the head 2 at a predetermined position on the disk 1, and it comprises the control circuit 7 and the external controller 14.

The external controller 14 comprises an interface 9, a microcomputer 10, ROM (read-only memory) 11, and RAM 12. The interface 9 is connected to the interface 8 of the optical disk storage 13 at one end thereof, and is connected to the microcomputer 10 at the other end thereof. ROM 11 and RAM 12 are connected to the microcomputer 10, respectively. The microcomputer 10 transmits several commands to the control circuit 7 via interfaces 8 and 9, such as an address search and an edge search. The term "an address search", as used herein, means to position the head 2 at a position having a predetermined address on the disk 1. The term "an edge search", as used herein, means to detect the border of the recorded region and unrecorded region by means of RF checking. The term "RF checking", as used herein, means to check for the presence of image radio frequency (RF) signals in the reproducing output of the head 2. For example, the head 2 can detect RSA by being moved from the recorded region sequentially for RF checking, while the head 2 can detect LRA by being moved from the unrecorded region sequentially. From which direction the head 2 is moved is a matter of choice. And whether the disk 1 is recorded by means of the sequentially inner-to-outer recording method or the sequentially outer-to-inner recording method has been inputted to the microcomputer 10 in advance.

The microcomputer 10 of the positioning controller according to the present invention operates as indicated in FIGS. 2A through 2D.

At first, a step 201 judges whether or not both interfaces 8 and 9 are in a state "H". The interfaces 8 and 9 may be synchronous interfaces or asynchronous interfaces, however, both interfaces must be in a state "H". Hereupon, according to the MIL logical symbols, "H" shows a state where both interfaces are switched on, and "L" shows a state where both interfaces are switched off. Therefore the microcomputer 10 must have a logical product circuit which operates only when both of the interfaces 8 and 9 are in a state "H". When the step 201 judges NO, the operational process of the positioning controller ends. But if the step 201 judges YES, the process transfers to a step 202.

The step 202 judges whether or not the disk 1 is loaded. The step 202 may judge YES if the head 2 can read an address of a track 0 on the disk 1 after the disk 1 is rotated and the track 0 is accessed. The step 202 can detect whether or not information is recorded at the track 0. If the information is not recorded at the track 0, the step 202 will know the disk 1 is the virgin medium. If the track 0 has an address 1, an address information showing SRA=1 can be stored in RAM 12. If the step 202 judges NO, then the process ends. But if the step 202 judges YES, the process transfers to a step 203.

The step 203 judges whether or not the optical disk storage 13 is in a recording mode state. The optical disk storage 13 has at least the recording mode and a reproducing mode. If the step 203 judges NO, then the process ends because the information cannot be recorded on the disk 1. But if the 203 judges YES, the process transfers to a step 204.

The steps 201 through 203 may be placed in any order. Therefore any step may come first. The microcomputer 10 judges these matters on the basis of status information showing the status of the optical disk storage 13 which is transmitted from the optical disk storage 13 at predetermined intervals and stored, for instance, in a status register of the RAM 12. The status information is not limited, needless to say, to the above-mentioned information used by steps 201 through 203.

A step 204 judges whether or not the address information M used for the positioning stored in RAM 12. Generally the RAM 12 has an address register for storing the address information M. The address information M may be rewritten occasionally by the microcomputer 10. The DRAM (dynamic RAM) may be used for RAM 12. The stored address information M is deleted whenever the disk 1 is ejected and is renewed whenever the recording of information is finished, so that the head 2 can be correctly positioned at a recording start position. Therefore the stored address information M in RAM 12 is always the latest LRA or RSA.

Figure 2A:
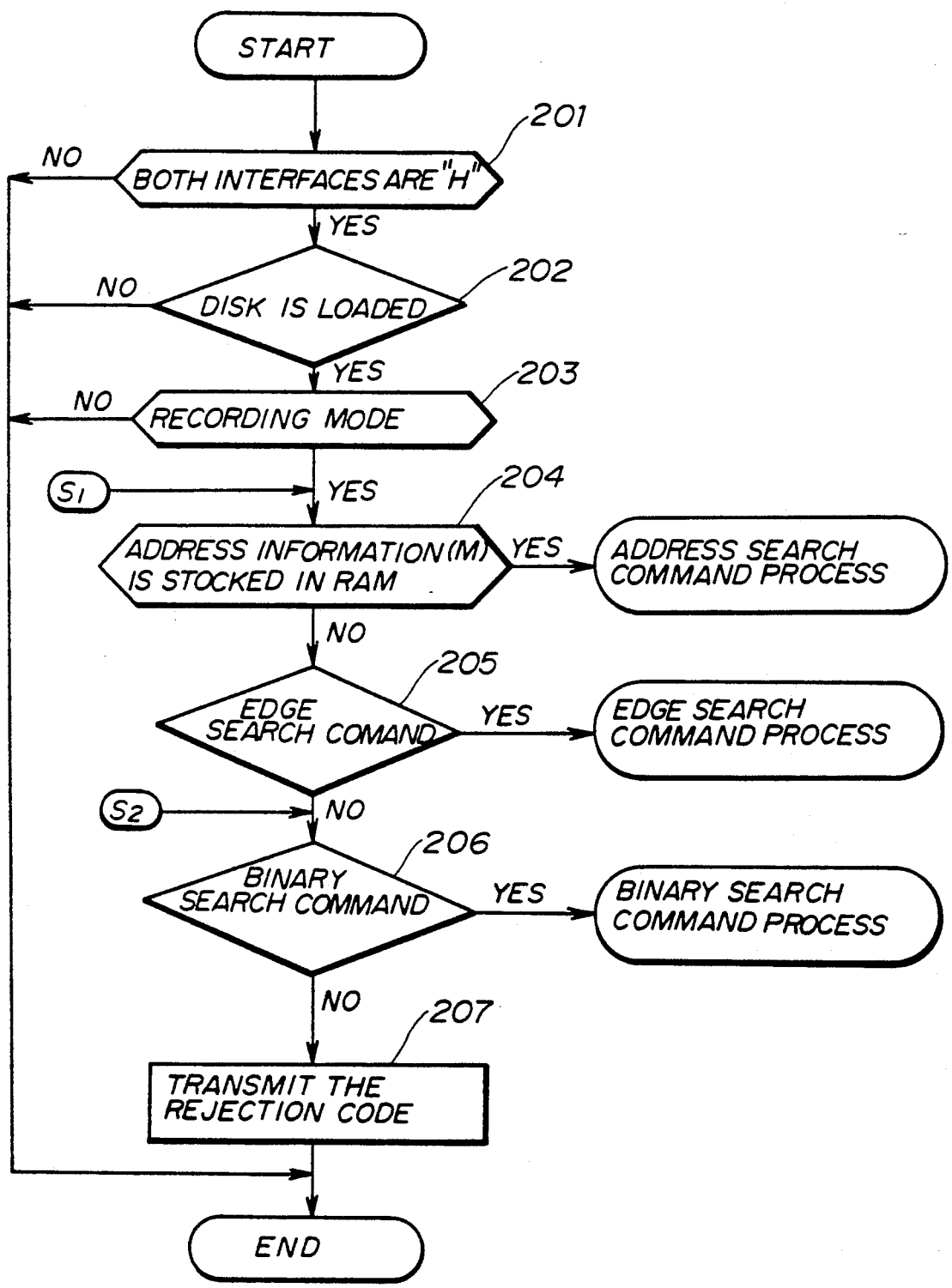
FIGS. 2A through 2D are flowcharts for explaining the operating of the positioning controller shown in FIG. 1.
Figure 2B:
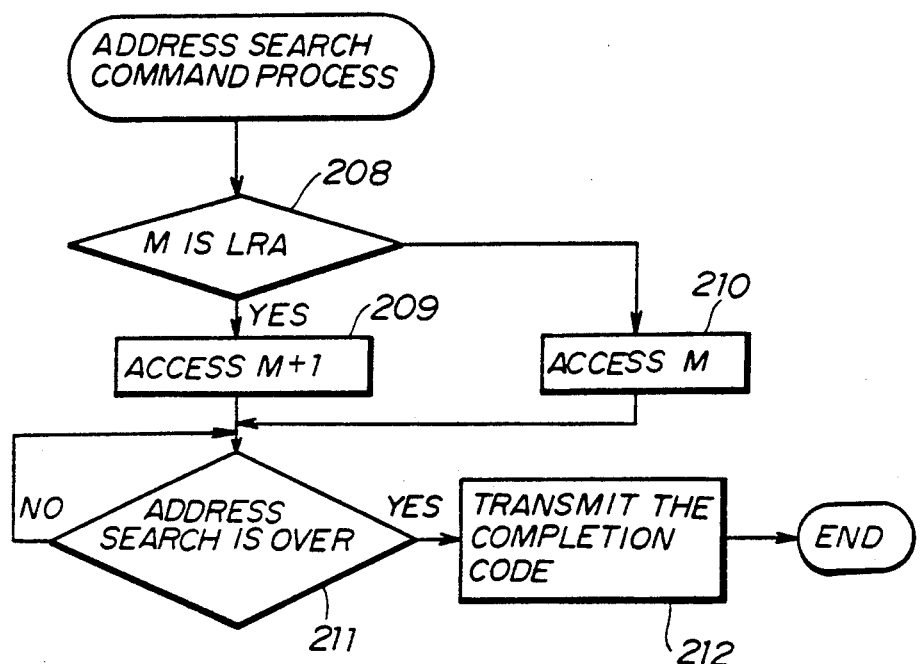

If the step 204 judges YES, the address search command is executed as shown in FIG. 2B.

FIG. 2B shows a process of the address search command. At first, a step 208 judges whether or not the address information M is LRA. The step 208 can judge whether the address information is either LRA or RSA by means of the direction of the RF checking. As mentioned above, the address information M is stored as either LRA or RSA. If the M is LRA, the step 209 positions head 2 at a position having an address M+1, that is, RSA. If the disk 1 has information recorded on it by means of the sequentially outer-to-inner recording method, the step 209 positions the head 2 at a position having an address M−1. If M is not LRA but instead RSA, a step 210 positions the head 2 at a position having an address M. Thus, the head 2 is always positioned at a recording start position. When the head 2 is positioned at the recording start position, the process ends, and thus, the head 2 records the predetermined information on the disk 1. The address information M may be made always equal to RSA so that the steps 208 and 209 may be omitted.

The microcomputer 10 usually transmits a status request command to the control circuit 7 to obtain the status information about whether the address search command is over since the address search command is executed. And a step 211 judges whether or not the address search command is over by means of the status information. If the step 211 judges YES, a step 212 transmits a completion code to a control part of the microcomputer 10 (not shown). Accordingly, the process ends, and the head 2 starts to record from the recording start position. The step 212 may indicates a flag showing the head 2 is positioned at the recording start position. However if the step 211 judges NO, the microcomputer 10 continues to transmit the status request command to the control circuit 7 until it receives the status information showing the address search is over.

If the step 204 judges NO, since the address information M used for positioning the head 2 at the recording start position is not stored in RAM 12, the process transfers to a step 205. Steps subsequent to the steps 205 search LRA or RSA to store the address information M in RAM 12.

The step 205 judges whether or not the edge search command is to be executed. If the binary search is executed for even the disk having a small recording region, it still takes much time to search the last recording position. Accordingly, it is necessary to judge whether the disk has a small recording region before executing the binary search command. Thus the searching time is shortened for the disk having a small recording region. But as the step 205 may be a matter of choice, the process may transfer from the step 204 to the step 206 to execute the binary search command. If the step 205 judges YES, the disk is edge-searched in a recording direction (forward direction) of the disk 1, as shown in FIG. 2C.

Figure 2C:
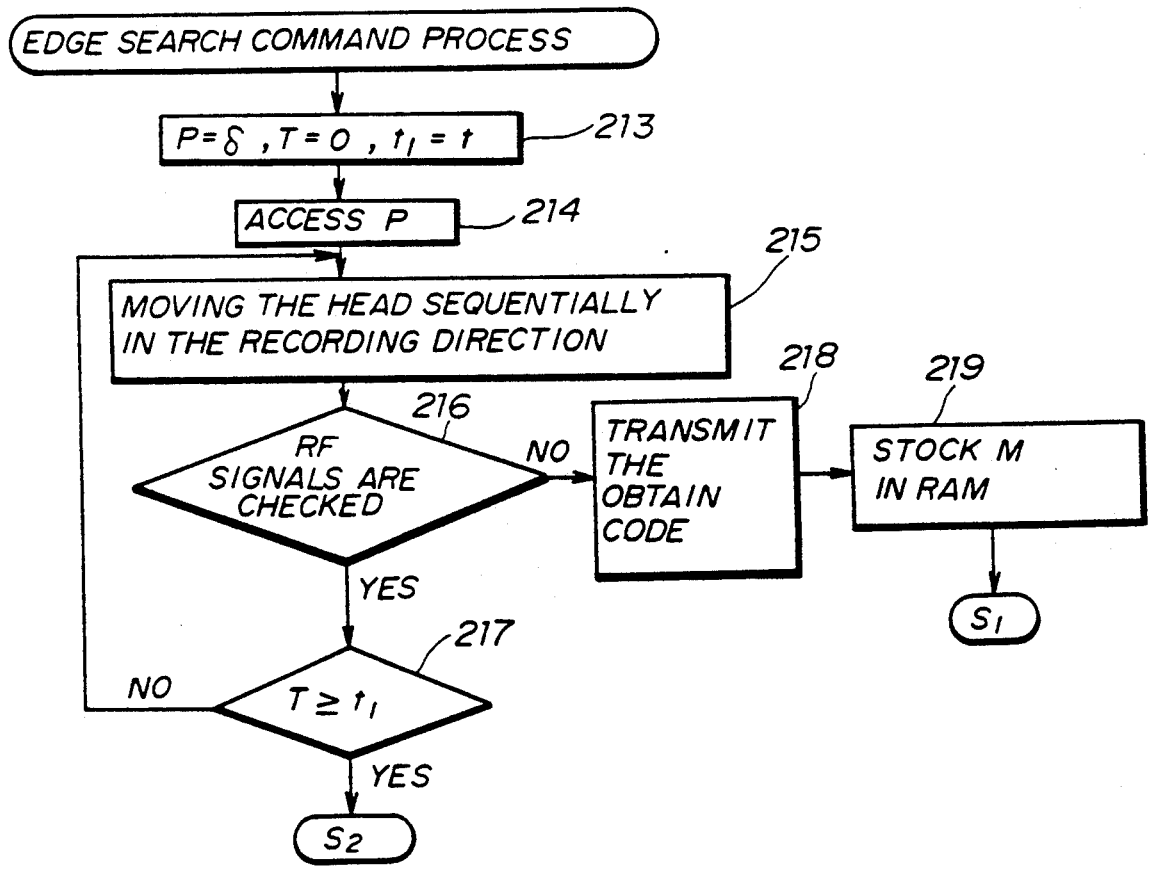

FIG. 2C shows the process of the edge search command as mentioned above. First, the step 211 creates variables, such as P, T, $t_1$. An initial value $\delta$ indicating a first address to be edge-searched is substituted for P. Since the disk 1 according to the embodiment has information recorded thereon by means of the sequentially inner-to-outer recording method, $\delta$ may be set up as 0. However if information was recorded up to a predetermined address, the address may be substituted for P. T shows the time elapsed measured by a clock. Therefore an initial value 0 is substituted for T. An initial value t indicating a predetermined time to be edge-searched is substituted for $t_1$. In this embodiment, the process ends depending upon whether T passes the predetermined time $t_1$ instead of whether a number of the edge-searched address reaches a predetermined value. However the process may end depending upon whether a number of the edge-searched address reaches a predetermined value. After creating these variables, a step 214 positions the head 2 at a position having an address P. After the head 2 is positioned, the step 215 moves the head 2 sequentially in the recording direction (forward direction) from the position at a predetermined speed. In this embodiment, the head 2 is moved sequentially inner-to-outer since the disk 1 is recorded by means of the sequentially inner-to-outer recording method. If the disk 1 is recorded by means of the sequentially outer-to-inner recording method, the head 2 is moved sequentially outer-to-inner, accordingly. The microcomputer 10 can transmit the value of the speed to the control circuit 7. Then a step 216 executes the RF checking, and judges whether or not the RF signals are checked. That is, the head 2 RF-checks by means of the forward reading while moved at a predetermined speed. Hereupon, the step 216 executes the RF checking in the vicinity of the position having the address P by means of forward reading. The step 216 cannot detect RSA if it judges YES, while it can detect RSA if it judges NO. Therefore, after the step 216 judges YES, a step 217 judges whether or not T passes $t_1$. If the step 217 judges YES, since much time will apparently be spent to edge-search the disk 1, the process transfers to a step 206 to execute the binary search command which will be described later. If the step 217 judges NO, the process is fed back to the step 215 to continue the edge search command process. Incidentally the step 215 may be deleted and the process may be fed back to the step 214 while P is substituted for P+1 if the step 217 judges YES. If the step 216 judges NO and detects RSA, the step 218 transmits the obtain code to the control part of the microcomputer 10, and then a step 216 stores the RSA in RAM 12 as the address information M. The step 218 indicates a flag showing the detecting of RSA. When the address information M is stored in RAM 12, the process transfers to the step 204 to execute the address search command.

Figure 2D:
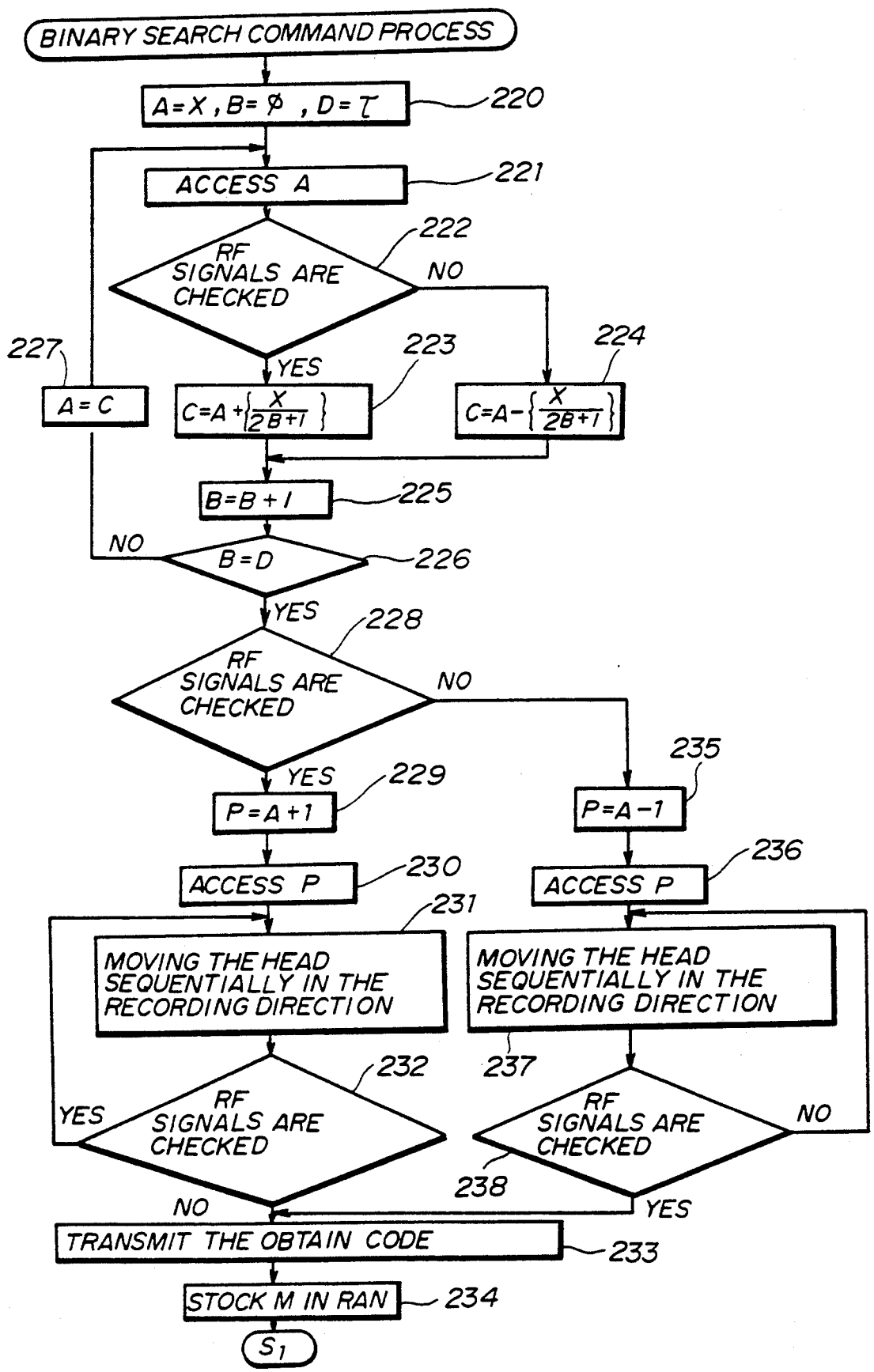

The step 206 judges whether or not the binary search command is to be executed. If the step 206 judges NO, then a step 207 transmits a rejection code to the control part, then the process ends. If the step 206 judges YES, the binary search is executed as shown in FIG. 2D. It takes more time to search either LRA or RSA of a disk having a broad recording region by means of the edge search only.

FIG. 2D shows the process of the binary search command. First, a step 220 creates the variables A, B, D.

An initial value x indicating {(total number of addresses on the disk 1)/2} is substituted for A. However the initial value x is not limited to such a value. For instance, x indicating [{(an edge-searched last address)-+(an address at the physical end position of the disk 1)}/2] may be substituted for A. Hereupon, the edge-searched last address can be approximately calculated by the predetermined speed and time elapsed T.

An initial value $\phi$, sometimes 0, is substituted for B, which indicates a counter for counting the binary-searched addresses. $\tau$ is substituted for D, which indicates times of execution of the binary search, so if the binary search is executed 10 times, $\tau$ is set at 10. After creating these variables, a step 221 positions the head 2 at a position having an address A. Accordingly, the head 2 is positioned at an almost central position of the disk 1. Then a step 222 executes the RF checking, and judges whether or not the RF signals are checked. The step 222 executes the RF checking in the vicinity of the position having the address A by forward reading as in the step 215. If the step 222 judges YES, a step 223 substitutes $$A + \left( \frac{x}{2^{(B+1)}} \right)$$

for C. And if the step 222 judges NO, a step 224 substitutes $$A - \left( \frac{x}{2^{(B+1)}} \right)$$

for C. After the step 223 or the step 224, a step 225 counts by adding B to 1. Next, a step 226 judges whether or not B is equal to D, and if it judges NO, a step 227 substitutes C for A to repeat the binary search until B is equal to D. Therefore, A is added if the step 222 has judged the position has been a recording region, and thus the head 2 is positioned at an almost three-fourths position from the center to the edge of the disk 1 in the forward direction (recording direction). On the other hand, A is subtracted if the step 222 has judged the position to be in a unrecorded region, and thus the head 2 is positioned at an almost one-fourth position from the center to the edge of the disk 1 in the forward direction. Accordingly, one of the characteristics of the present invention is to use the binary search method depending upon the judging result of the step 222. If the disk 1 is recorded by means of the sequentially outer-to-inner method, the value of C which is substituted for A is reversed, of course. After the step 226 judges YES, and the predetermined number of times of the binary search is executed, the process transfers to a step 228. After the predetermined number of times of the binary search is executed, a position having an address A may be approximate to the last recorded position or the recording start position. Therefore the positioning controller of the embodiment does not binary-search an infinite number of times, but edge-searches to detect LRA or RSA.

The step 228 judges whether or not the RF signals are checked at the position having the address A. The step 228 executes the RF checking in the vicinity of the position having the address A by forward reading as in the step 216. If the step 228 judges YES, since RSA is located ahead of the address A, a step 229 substitutes the variable $\delta$ having A+1 for P of the edge search command process, as mentioned above. Thus an address next to the address A is searched. Subsequently, a step 230 positions the head 2 at a position having an address P, then a step 231 moves sequentially the head 2 at a predetermined speed in the recording direction. Accordingly, a step 232 executes the RF checking again. The step 232 executes the RF checking in the vicinity of the position having the address A by forward reading as in the step 216. If the step 232 still checks the RF signals, the process is fed back to the step 231 in order to continue the edge searching. In this process, it is needless to create the variables T and $t_1$ because the process is continued until the step 232 detects RSA. If the step 232 judges NO, since RSA can be detected, a step 233 transmits the obtain code to the control part, and then a step 234 stores RSA in RAM 12 as the address information M. After this storing, the process transfers to a step 204. Hereupon, $S_1$ is connected directly to the address search command process.

On the other hand, if the step 228 judges NO, since RSA is located ahead of the address A, a step 235 substitutes $\delta$ having A−1 for P. Thus, an address preceding the address A will be searched next. A step 236 positions the head 2 at a position having an address P, and a step 237 moves the head 2 sequentially in the recording direction at a predetermined speed. Accordingly, a step 238 executes the RF checking. The step 238 executes the RF checking in the vicinity of the position having the address A by forward reading as in the step 216. If the step 238 judges NO, the process is fed back to the step 237 in order to continue the edge searching. However if the step 238 judges YES, the process transfers to the step 233 because RSA can be detected. If the disk 1 has information recorded thereof by means of the sequentially outer-to-inner method, the step 229 substitutes $\delta$ having A−1 for P, and the step 235 substitutes $\delta$ having A+1 for P.

According to the present invention, a head is positioned at a recording start position in a shorter time than is done in the conventional art. The present invention can be applied to various kinds of disk storages, particularly a write-once optical disk storage, such as an erasable optical disk storage, an optical-magnetic disk storage, and a magnetic disk storage.

Further, the present invention is not limited to these preferred embodiments, but various variations and modifications may be made without departing from the scope of the present invention.

What is claimed is:

1. A positioning controller which is used for a disk storage device including a disk on which addresses are prerecorded in a recordable region by means of sequential addressing, disk driving means for driving of the disk, a head for recording information on the disk and reproducing information therefrom, and actuating means for moving the head to a position corresponding to a predetermined address on the basis of address information indicating the predetermined address, the information being recorded sequentially on the disk, said positioning controller comprising:

first control means for controlling an operation of the disk driving means and/or a recording and/or reproducing operation of the head;

second control means, connected to the actuating means, for supplying the address information to the actuating means;

first judging means, connected to said first control means and second control means, for judging whether or not the information is recorded on an arbitrary position on the disk;

position searching means, connected to said first judging means, after the information is reproduced by the head at a predetermined position by said first control means and said second control means, for executing a first binary search for addresses from the predetermined position in a forward direction in which the information is recorded if said first judging means judges the information is recorded at the predetermined position, for executing a second binary search for addresses from the predetermined position in a backward direction opposite to the forward direction if said first judging means judges the information is not recorded at the predetermined position, for continuing one of the first binary search and the second binary search in the forward direction if said first judging means judges the information is recorded at a searched position which has been searched by one of the first binary search and the second binary search, and for continuing one of the first binary search and the second binary search in the backward direction if said first judging means judges the information is not recorded at a searched position which has been searched by one of the first binary search and the second binary search, in order to search a target address before second information is recorded on the disk, which target address approximately corresponds to the last recorded position of first information recorded just before the second information; and memory means, connected to said position searching means, for memorizing the target address searched by said position searching means as the address information, the target address being one of a last recorded address corresponding to the last recorded position of the first information and a recording start position next to the last recorded address in the forward direction, and said second control means being connected to said memory means for supplying the address information memorized by said memory means to the actuating means so that the head is positioned at the recording start position corresponding to the recording start address.

2. A positioning controller according to claim 1, wherein the predetermined position is at an almost central position of the disk corresponding to an address having a number which is half the total number of addresses.

3. A positioning controller according to claim 1, wherein said position searching means further comprises:

first searching means for searching a first address located in the vicinity of the target address by executing a binary search a predetermined number of times according to a judgment of said first judging means; and second searching means, connected to said first judging means and the first searching means, for searching sequentially from the first address in the forward direction if said first judging means judges the information is recorded at the first address, and for searching sequentially from the first address in the backward direction if said first judging means judges the information is not recorded at the first address, in order to search the target address.

4. A positioning controller according to claim 3, wherein the second searching means detects the target address to be one of the last recorded address and the recording start address by means of the level of a reproduced signal of the information, the second searching means detecting the recording start address because of the low level of the reproduced signal thereat if the information is recorded at the first address, the second searching means detecting the last recorded address because of the high level of the reproduced signal thereat if the information is not recorded at the first address, and said memory means memorizing the target address and correlating the target address with the level of the reproduced signal.

5. A positioning controller according to claim 4, wherein said second control means further comprises second judging means for judging whether the target address memorized by said memory means is the last recording address or the recording start address on the basis of the level of the reproduced signal, and the second control means supplies the address information to the moving means according to a judging result of the second judging means.

6. A positioning controller according to claim 1, wherein said position searching means further comprises:

third searching means for searching sequentially a predetermined number of addresses initially in the forward direction, the information being reproduced by the head at the predetermined position only when the third searching means can not search the target address.

7. A positioning controller according to claim 6, wherein the predetermined position is a position corresponding to a fifth address which is centered between a third address and a fourth address, the third address being located farthest in the forward direction among the predetermined number of addresses, and the fourth address being located farthest in the forward direction among all addresses on the disk.

8. A positioning controller according to claim 3, wherein said position searching means further comprises:

third searching means for searching sequentially a predetermined number of addresses initially in the forward direction, the information being reproduced by the head at the predetermined position only when the third searching means can not search the target address.

9. A positioning controller according to claim 1, wherein said positioning controller further comprises:

third judging means for judging whether or not the disk storage device has a predetermined status, said positioning searching means beginning to search the target address only when the third judging means judges the disk storage device has a predetermined status.

10. A positioning controller according to claim 7, wherein the status is a recording mode.

11. A positioning controller according to claim 7, wherein the disk storage device includes said first control means, said second control means, said first judging means, said position searching means and memory means.

12. A positioning controller according to claim 1, wherein said first control means, said second control means, said first judging means and position searching means are located in a microcomputer connected to the disk storage device, and said memory means is located in a random access memory which is connected to the microcomputer.

13. A positioning controller according to claim 1, wherein the disk is a write-once optical disk, the head is an optical head, and the disk storage is a write-once optical disk storage.

* * * * *